US012585473B2

(12) United States Patent
Huang et al.

(10) Patent No.: US 12,585,473 B2
(45) Date of Patent: Mar. 24, 2026

(54) COMMUNICATION LINK MANAGEMENT FOR EXPANSION CARDS

(71) Applicant: Dell Products L.P., Round Rock, TX (US)

(72) Inventors: Po-I Huang, Xindian (TW); Ying-Chang Tung, Datong District (TW); Chun-Wei Hsieh, Taipei (TW); Shang-Ting Qiu, Taipei City (TW)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 18/359,529

(22) Filed: Jul. 26, 2023

(65) Prior Publication Data

US 2025/0036419 A1 Jan. 30, 2025

(51) Int. Cl.
*G06F 9/4401* (2018.01)
(52) U.S. Cl.
CPC .................................. *G06F 9/4401* (2013.01)
(58) Field of Classification Search
CPC ....................................................... G06F 9/4401
See application file for complete search history.

(56) References Cited

U.S. PATENT DOCUMENTS

| | | | | |
|---|---|---|---|---|
| 11,226,919 B1 * | 1/2022 | Austin | ................... | G06F 9/4401 |
| 2016/0134559 A1 * | 5/2016 | Abel | ....................... | H04L 49/30 |
| | | | | 370/389 |
| 2021/0263875 A1 * | 8/2021 | Lin | ..................... | G06F 13/4221 |

* cited by examiner

*Primary Examiner* — Idriss N Alrobaye
(74) *Attorney, Agent, or Firm* — WOMBLE BOND DICKINSON (US) LLP

(57) ABSTRACT

Methods, systems, and devices for providing computer implemented services are disclosed. To provide the computer implemented services, an identification of a startup of a data processing system may be made. Based on the identification, a determination may be made regarding whether a device is present in an expansion slot of the data processing system. If the device is present, then another determination may be made regarding whether identification information is able to be obtained from the device. If obtained, the identification information may be interpreted to obtain communication link bifurcation settings for the device. Default communication link training settings may then be updated based on the bifurcation settings to obtain updated training settings. Communication link training may then be initiated for a communication link using the updated training settings.

20 Claims, 5 Drawing Sheets

400

COMMUNICATION LINK MANAGEMENT FOR EXPANSION CARDS

FIELD

Embodiments disclosed herein relate generally to device management. More particularly, embodiments disclosed herein relate to systems and methods for managing communications between devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
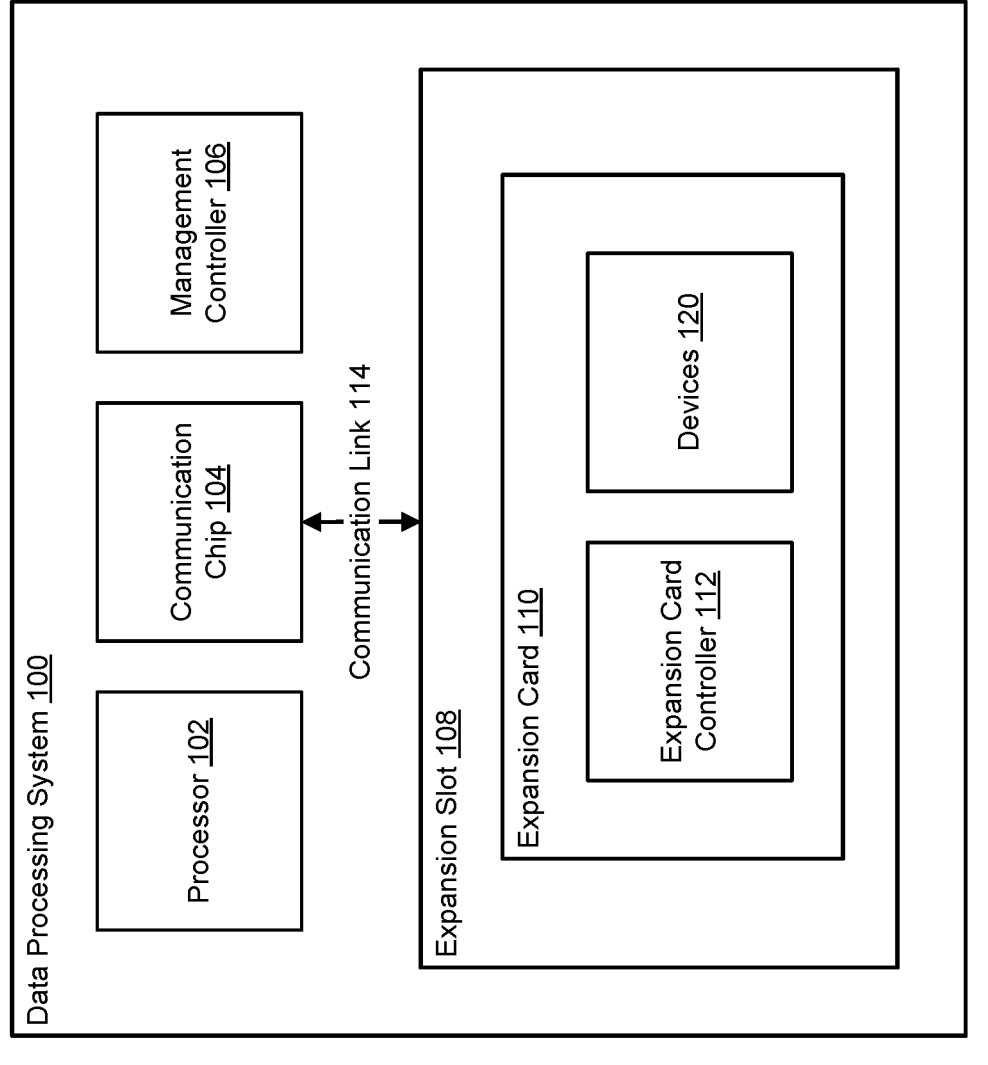
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing, at least in part, computer implemented services. To provide the computer implemented services, the system may include various hardware components (e.g., processors, random access memory (RAM), storage devices, communication devices, etc.). These hardware components may facilitate various functionalities of the data processing system, thereby allowing the provision of the computer implemented services by the data processing system.

When providing the computer implemented services, any of the hardware components of data processing system may communicate with one another via one or more communication links. The communication links may be established by configuring the operation of various communication components of the data processing system and/or the corresponding hardware components.

However different devices may communicate in different manners and may rely on the data processing system to identify a device for which a communication link is established. To identify the device, the device may provide identification information on which establishment of the communication link depends.

By being capable of providing the identification information, a mechanism for establishing the communication for the device may be provided. The mechanism may include (i) identifying a presence of the device in an expansion slot of the data processing system, (ii) attempting to obtain the identification information from the device, (iii) determining if the identification information is obtained, (iv) based on the determination, using a set of training rules to obtain a type of communication link training that results in a communication link being properly configured for the device. Once properly configured, communication for the device may be established. Thus, functionalities of the data processing system that are dependent on the established communication may be facilitated by the device, thereby allowing the computer implemented services to be provided by the data processing system.

In an embodiment, a method is provided for managing security of a data processing system.

The method may include identifying a startup of the data processing system; making a first determination, based on the identification, regarding whether a device is present in an expansion slot of the data processing system; in an instance of the first determination in which the device is present in the expansion slot: attempting to obtain identification information from the device; making a second determination regarding whether the identification information is obtained; in a first instance of the second determination in which the identification information is not obtained: initiating communication link training for a communication link between the device and a communication device of the data processing system using default communication link training settings; and in a second instance of the second determination in which the identification information is obtained: interpreting the information to obtain communication link bifurcation settings for the device; updating the default communication link training settings based on the communication link bifurcation settings to obtain updated training settings; and initiating the communication link training for the communication link using the updated training settings.

Attempting to obtain the identification information from the device may include requesting, by a management controller of the data processing system, the identification information from a controller of the device.

The device may be an expansion card that passes through communications via the communication link to at least a second device attached to the expansion card.

The management controller may send the request to the device via a sideband channel, and the expansion slot may be operably connected to a processing complex of the data processing system via a communication channel.

Interpreting the identification information may include performing a lookup based on a type of the device, the lookup returning the bifurcation settings.

The bifurcation settings may specify a division of sub-links of the communication link, the division defining a portion of the sub-links for exclusive use by the second device, and the portion may include less than all of the sub-links.

Updating the default communication link settings may include providing, by the management controller, the updated training settings to a startup management entity of the data processing system tasked with performing the startup; and configuring, by the startup management entity and based on the updated training settings, the communication device that supports the communication link.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer implemented services. The computer implemented services may include any type and/or quantity of computer implemented services. For example, the computer implemented services may include data storage services, instant messaging services, database services, and/or any other type of service that may be implemented with a computing device.

To provide the computer implemented services, the system may include various hardware components. For example, data processing system 100 may include processors (e.g., 102), random access memory (RAM), storage devices, communication devices (e.g., 104), etc. These hardware components may facilitate various functionalities of the data processing system, thereby allowing the provision of the computer implemented services by the data processing system.

Depending on the type of computer implemented services that are provided, it may be advantageous to include different types of hardware components in data processing system 100. For example, different types of computer implemented services may benefit from having access to different types of hardware devices.

To facilitate changes in hardware components, data processing system 100 may include any number of expansion slots (e.g., 108). The expansion slots may allow for various types of hardware components to be reversibly placed in operable communication with hardware components of data processing system 100 such as processor 102. For example, expansion slot 108 may be implemented with a protocol compliant expansion slot that receives an edge connector or other type of connector of a hardware component. In this manner, processor 102 may use various functionalities provided by hardware components positioned in expansion slot 108. Consequently, the hardware components available to provide computer implemented services may be customized over time by changing the components attached to expansion slot 108.

When providing the computer implemented services, any of the hardware components of data processing system 100 may communicate with one another (and/or those hardware components in expansion slot 108) via one or more communication links (e.g., 114). The communication links may be established by configuring the operation of various communication components of the data processing system (e.g., communication chip 104) and/or the corresponding hardware components (e.g., the hardware components being endpoints of the communication links).

For example, processor 102 may communicate with a device positioned in expansion slot 108 via communication chip 104 (e.g., may be part of a communication bus, point to point links, etc.). To facilitate the communications, communication chip 104 may be operably connected to the device or slot for the device via communication link 114. Communication link 114 may utilize one or more conductors between communication chip 104 and expansion slot 108 to transmit electrical signals between these components. The electrical signals may support transmission of data between these components.

Different devices positioned in expansion slot 108 may communicate in different manners (e.g., may utilize different conductors of communication link 114, may utilize different electrical signaling schemes, may support different communication rates, etc.). Consequently, communication chip 104 may need to be configured to match a manner of communication of the type of hardware component positioned in expansion slot 108.

To configure communication link 114, communication link training may be performed during a startup of data processing system 100. For example, assume a device (e.g., a graphical processing unit (GPU), a storage device, a network adapter, etc.) is inserted into (connected to) expansion slot 108 (e.g., a peripheral component interconnect express (PCIe) slot) of the data processing system before the startup. During the startup, a presence of the device may be acknowledged, and default training settings may be used to perform the communication link training. The communication link training process may identify the manner in which communication chip 104 needs to be configured to communicate with the device in expansion slot 108 (e.g., such as identifying a rate of communication) in a nominal manner. Once communication chip 104 is configured, the resulting communication link may provide an avenue through which communications between the device in expansion slot 108 and other devices such as processor 102 may flow.

By using communication link 114, the device may facilitate the one or more functionalities of data processing system 100, thereby allowing the computer implemented services to be provided by data processing system 100. For example, processor 102 may offload workloads to devices positioned in expansion slot 108.

However, the communication link training process make one or more assumptions regarding the operation of the device positioned in expansion slot 108. For example, the communication link training process may presume that only one device is operably connected to expansion slot 108. If more than one device is operably connected to expansion slot 108, the communication link training process may fail to identify settings for communication chip 104.

For example, more than one device connected to the data processing system by the expansion slot may not be acknowledged during the startup because of the assumptions and/or limitations on the devices participating in the communication link training. Consequently, if the device is an expansion card (e.g., a serial advanced technology attachment (SATA) expansion card, a universal serial bus (USB) expansion card, and/or other type of interposer adapted to route communication from more than one device to expansion slot 108), the communication link training may result in a faulty configuration of communication chip 104 and/or the training process may fail entirely because the training process may need to take into account separate use of some of the conductors of communication link 114 by two different devices (e.g., may need to take into account bifurcation settings for the more than one device).

Based on the faulty configuration, communication between the other components of data processing system 100 and the more than one device operably connected to expansion slot 108 may not be properly established. Thus, one or more functionalities that depend on the communication being properly established may not be facilitated, and the computer implemented services that depend on the facilitation may be prevented entirely or in part (e.g., impaired).

In general, embodiments disclosed herein may provide methods, systems, and/or devices for managing a startup of a data processing system in a manner that improves the likelihood of successful completion of communication link training. Moreover, embodiments disclosed herein provide a mechanism for establishing communications for more than one device operably connected to expansion slots via an interposer or other type of device inserted into the expansion slot.

To do so, presence of interposers or other types of expansion slot division devices may be proactively identified. The expansion slot division devices may facilitate connection between the more than one device and the other components of the data processing system via a single expansion slot.

To establish communications devices connected to the interposer, an interposer present in the expansion slot may be adapted to (i) route communication from the more than one device to the data processing system via the expansion slot, and (ii) provide identification information usable to customize subsequently performed communication link training. By doing so, the communication link training may be performed in a manner that takes into account the interposer, thereby logically dividing a single communication link into at least two sub-links dedicated to corresponding devices attached to the interposer.

By providing the identification information, the link training process may take into account connectivity between conductors of the communication link and the devices operably connected to the communication link via the interposer. To do so, prior to performing link training, (i) presence of a device (e.g., the interposer) in the expansion slot may be identified, (ii) attempts to obtain identification information from the device may be made, (iii) if identification is obtained during the attempts, the identification information may be used to obtain a set of training rules (e.g., link bifurcation settings that define how the conductors of the link are allocated to different devices connected to an expansion slot) that when used to perform communication link training results in a communication link that supports communications for all of the devices connected to the expansion slot.

To provide the above noted functionality, the system (e.g., data processing system 100) of FIG. 1 may include processor 102, communication chip 104, management controller 106, expansion slot 108, expansion card 110, and communication link 114. Each of these components is discussed below.

Processor 102 may be implemented with a hardware process such as a central processing unit, or other type of data processing device.

Communication chip 104 may be implemented using one or more hardware components that facilitate communications between hardware components. For example, communication chip 104 may be implemented using a PCIe chip.

Communication link 114 may be implemented with one or more conductors that facilitate transmission of electrical signals.

Expansion card 110 may allow operable connection between devices 120 and a single connection slot (e.g., expansion slot 108) of data processing system 100. To do so, expansion card 110 may be implemented with an interposer adapted to (i) route communication for connected devices while (ii) allowing a variation in a quantity of the connected devices. For example, expansion card 110 may be implemented with a serial advanced technology attachment (SATA) expansion card used to route communication between the one or more storage devices (e.g., devices 120) and static hardware components of data processing system 100. To provide its functionality, expansion card 110 may include expansion card controller 112 (discussed further below) and may be operably connected to expansion slot 108.

Expansion slot 108 may be implemented using a receiver for a device. The device my include an edge connector or other type of interface for physically connecting to the receiver. The receiver and connector of the device may include electrical contacts that establish electrical connections between the conductors of communication link 114 and various portions of the device.

For example, expansion slot 108 may include a peripheral component interconnect express (PCIe) bus connection that allows for transmission of electrical signals between the components of data processing system 100 and a device positioned in expansion slot 108 (e.g., 110). By doing so, expansion slot 108 may facilitate communication using communication link 114.

However, because of the one or more assumptions regarding the operation of the device positioned in expansion slot 108, discussed previously, communication link 114 may not be properly configured to establish communication between expansion card 110 and communication chip 104 if the training process does not take into account how the conductors of communication link 114 are allocated to different devices 120 by expansion card 110.

To properly configure communication link 114, expansion card 110 may be implemented using an interposer that includes expansion card controller 112. Expansion card controller 112 may, in addition to other functionalities, provide identification information regarding expansion card 110. The identification information may indicate and/or may be used to obtain bifurcation settings for the conductors of communication link 114 based on how expansion card 110 allocates the conductors to devices 120.

For example, consider a scenario where communication link 114 includes ten conductors. To enable two devices to operably connect to expansion slot 108, expansion card 110 may internally route four of the conductors to a first device of devices 120 and six of the conductors to a second device of devices 120. By identifying itself, communication chip 104 and/or other components may take this bifurcation of the conductors into account during communication link training.

For example, the bifurcation settings may specify how communication chip 104 may utilize conductors of communication link 114, different electrical signaling schemes, support various communication rates, etc. for communication with device 120 reachable via communication link 114 and expansion card 110. By providing the identification information, management controller 106 may obtain the bifurcation setting during a startup of data processing system 100.

Devices 120 may be implemented using one or more devices that may cooperate with processor 102 and/or other components of data processing system 100 to provide computer implemented services. For example, devices 120 may be implemented with one or more storage devices that may be used to provide data storage services. To provide third functionality, devices 120 may be operably connected to expansion card 110.

Management controller 106 may be implemented using a system on a chip, or other independently operating data processing system from the host data processing system 100. Management controller 106 may, in addition to other functionalities, facilitate communication link training for communication link 114. To do so, management controller 106 may include its own processor, memory, network connection, and access to a system bus. For example, management controller 106 may use special communication channels (e.g., sideband communications) to interact with other hardware components of data processing system 100. For example, interaction with the other hardware components may include (i) obtaining data from the other hardware components, (ii) providing data to the other hardware components, and/or (iii) initiating performance of specific operations by the other components. Management controller 106 may facilitate the configuration of communication chip 104 (e.g., to bifurcate the conductors during communication link training) during the startup based on processor 102.

As part of the startup, processor 102 may initiate operation of a basic input/output system (BIOS). The BIOS may facilitate a power on self-test (POST) for data processing system 100 as a way to manage the startup. As part of the BIOS functionality, management controller 106 may be notified of the startup to initiate facilitation of configurations.

Additionally, once the communication links (e.g., 114) are properly configured and the startup is complete, processor 102 may facilitate execution of computer commands for hardware components of data processing system 100. To do so, processor 102 may (i) receive a request for execution of a computer command, (ii) interpret the computer command to obtain instructions that may be usable by an intended recipient (e.g., devices capable of fulfilling the request such as devices 120), and (iii) initiate provision of the instructions to the intended recipient. By doing so, processor 102, in conjunction with the components discussed above, may cause data processing system 100 to provide the computer implemented services.

Figure 2A:
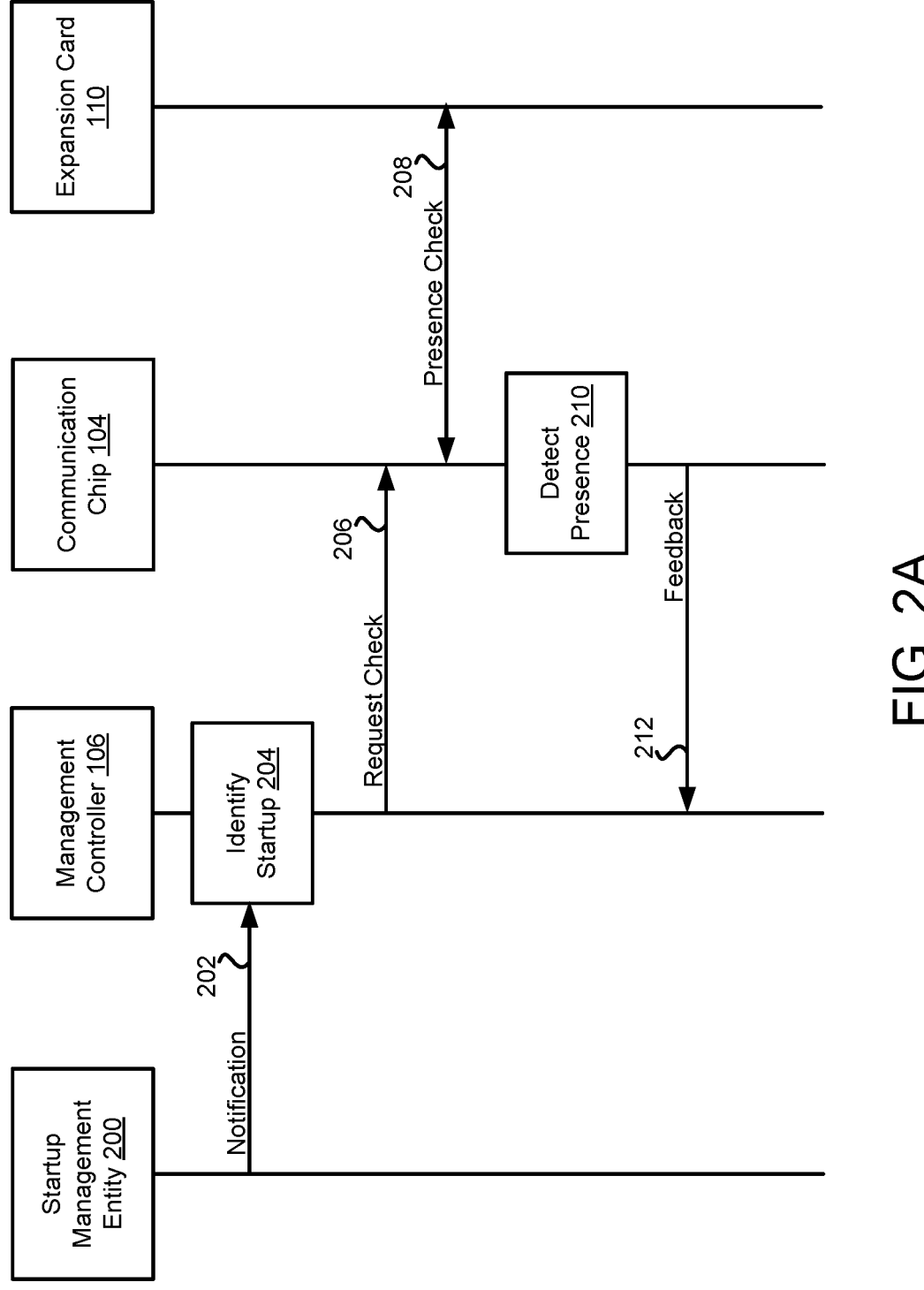
FIGS. 2A-2B show data flow diagrams illustrating a startup of a data processing system in accordance with an embodiment.
Figure 2B:
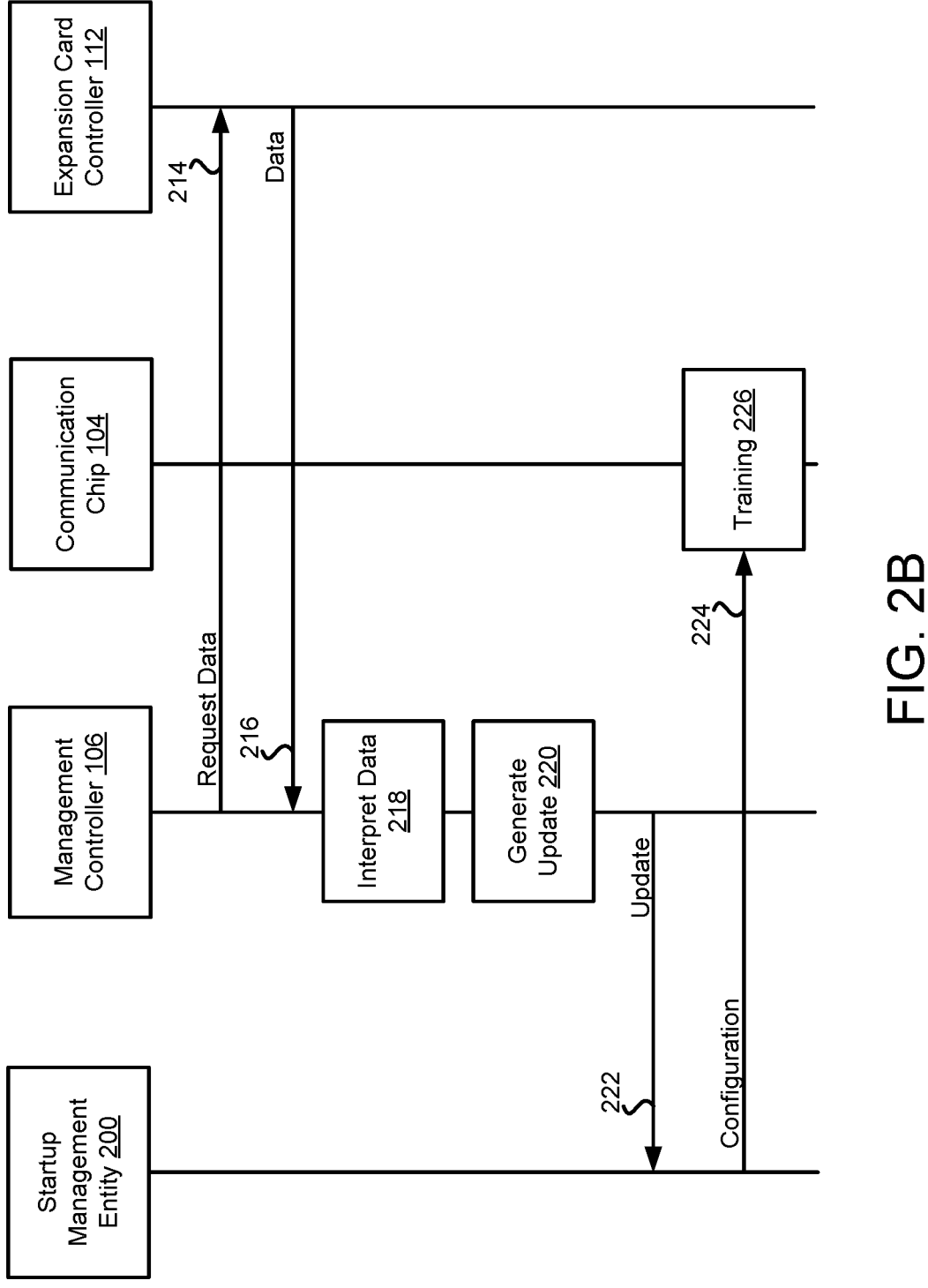
Figure 3:
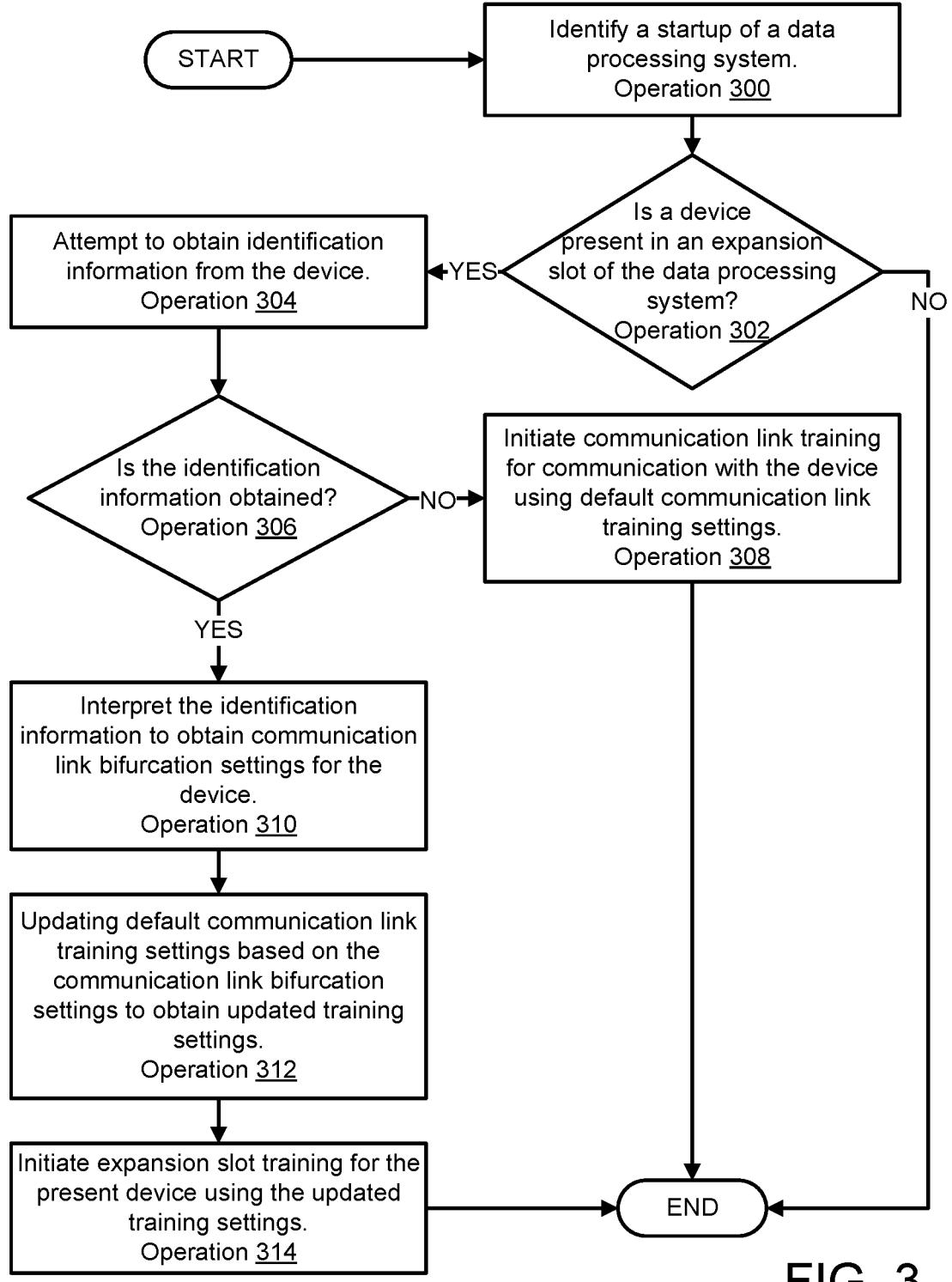
FIG. 3 shows a flow diagram illustrating a method for managing a startup of a data processing system in accordance with an embodiment.

When performing their functionality, processor 102, communication chip 104, management controller 106, expansion slot 108, expansion card 110, and/or communication link 114 may perform all, or a portion, of the methods and/or actions described in FIGS. 2A-3.

Figure 4:
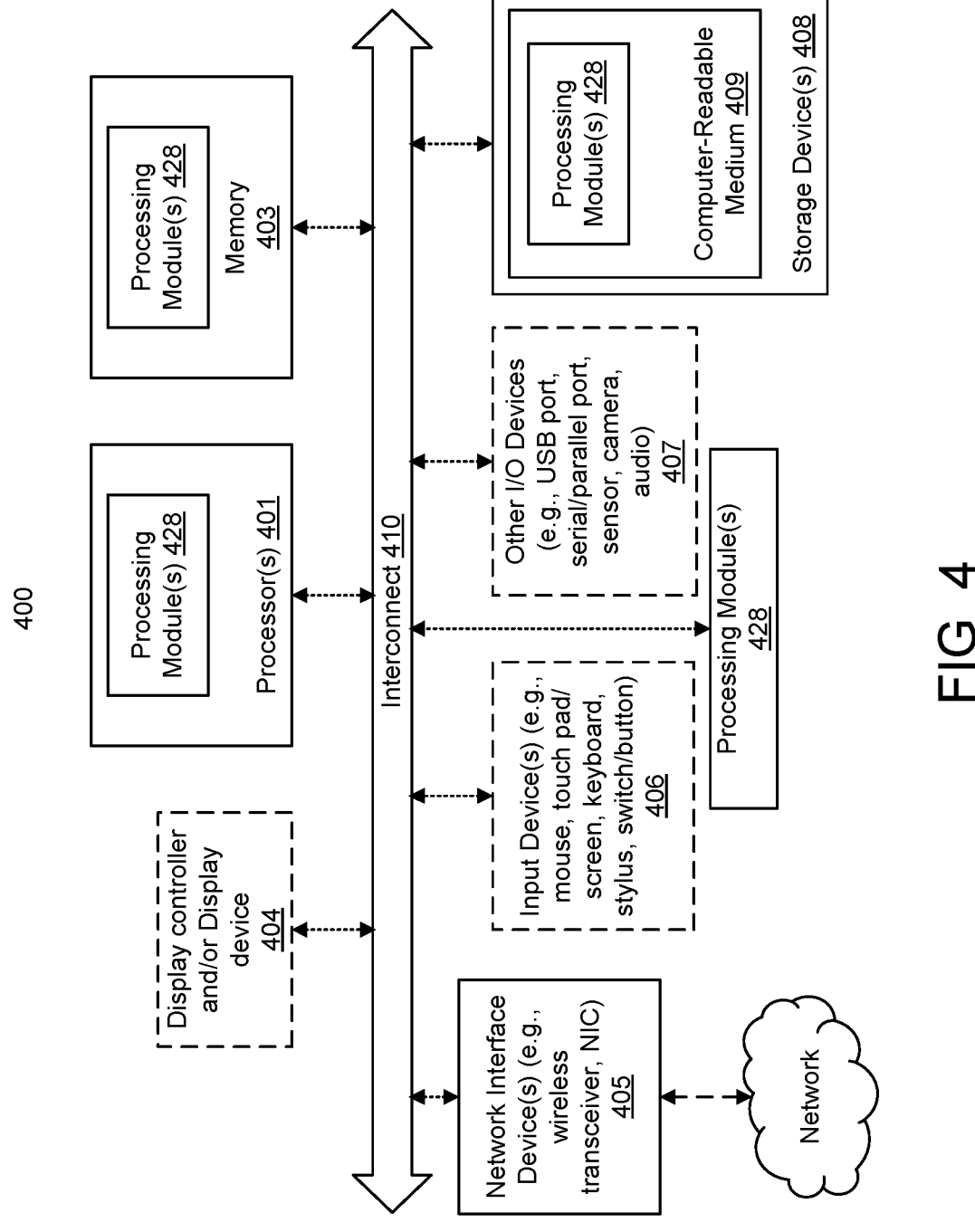
FIG. 4 shows a block diagram illustrating a data processing system in accordance with an embodiment.

Data processing system 100 may be implemented using one or more computing devices such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. Refer to FIG. 4 for additional details regarding computing devices.

While illustrated in FIG. 1 as including a limited number of specific components, a system in accordance with an embodiment may include fewer, additional, and/or different components than those illustrated therein. For example, while illustrated as being separate, the functionalities of any of the components shown in FIG. 1 may be performed via a single device or divided among any number of devices.

To further clarify embodiments disclosed herein, interactions diagrams in accordance with an embodiment are shown in FIGS. 2A-2B. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using named rectangular boxes at the top of each figure. Lines descend from each of these boxes. Boxes superimposed over these lines may indicate processes performed by the corresponding component, and arrows between the descending lines indicate interactions between the components.

Generally, the processes and interactions are temporally ordered in an example order with time increasing from the top to the bottom of each page. For example, the interaction labeled as 206 may occur prior to the interaction labeled as 208. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. FIG. 2A may illustrate a process for managing a startup of a data processing system in accordance with an embodiment.

At interaction 202, startup management entity 200 may send a notification to management controller 106. The notification may be an indication that a startup of a data processing system (e.g., 100) has been initiated. For example, startup management entity 200 may be implemented with a basic input/output system (BIOS) or other type of management entity. Startup management entity 200 may facilitate a booting sequence of the data processing system. As part of the booting sequence, communications between hardware components may be established using communication link training, as previously discussed with regard to FIG. 1. The communication link training may establish communication procedures which may be used during a run time of the data processing system to provide computer implemented services by facilitating communications between components positioned in expansion card 110 and other system components. However, due to different devices communicating in different manners, an identification of the devices operably connected to the data processing system may be performed. Thus, to establish the communications, management controller 106 may be used. To do so, startup management entity 200 may use direct communication methods such as sideband communications of management controller 106 to send the notification.

Once the notification is obtained by management controller 106, at operation 204, the startup may be identified. Based on this identification, management controller 106 may initiate interaction 206.

At interaction 206, management controller may request for a check to be performed by communication chip 104. Communication chip 104 may, based on the request, check for a presence of a device in, for example, an expansion slot (e.g., 108). To do so, communication chip 104 may utilize various hardware resources (e.g., cabling, traces, etc.) of the data processing system to send and/or receive electrical signals from various connection points (e.g., the expansion slot) of the data processing system. Thus, by initiating interaction 206, management controller may prompt a presence check of the expansion slot.

At interaction 208, a presence check for expansion card 110 may be performed by communication chip 105. Communication chip 104 may do so using the various hardware resources, as noted above.

Based on the electrical signals received from expansion card 110 in the expansion slot, at operation 210, presence of expansion card 110 may be detected by communication chip 104. Once detected, communication chip 104 may initiate interaction 212.

At interaction 212, communication chip 104 may send feedback to management controller 106 based on the request send during interaction 206. This feedback may include information indicative of the presence of expansion card 110 in the expansion slot. However, an identity (e.g., a type of the device present) of expansion card 110 may not be known solely on the detected presence. Therefore, management controller may further initiate the mechanisms for proper configuration of devices operably connected to the data processing system by requesting data regarding expansion card 110. Refer to FIG. 2B for additional information regarding an identification of expansion card 110.

Turning to FIG. 2B, a second interaction diagram in accordance with an embodiment is shown. FIG. 2B may illustrate a process for managing a startup of a data processing system in accordance with an embodiment.

At interaction 214, and as previously mentioned, management controller 106 may attempt to obtain data regarding expansion card 110. To do so, a request may be sent from management controller 106 to expansion card controller 112 (a controller of expansion card 110, discussed with regard to FIG. 1).

At interaction 216, expansion card controller 112 may provide identification information regarding expansion card 110 to management controller 106. The identification information may include information indicating (i) what type of device expansion card 110 is, (ii) a preferred manner of communication for expansion card 110, (iii) bifurcation settings for expansion card 110, and/or (iv) any other information regarding expansion card 110 usable to properly configure communication for expansion card 110.

At operation 218, management controller 106 may interpret the identification information received by expansion card controller 112. To do so, management controller 106 may process the information received using, for example, various algorithms to obtain bifurcation settings for expansion card 110. These bifurcation settings may indicate how electrical signals of conductors of the expansion slot and communication link 114 should be used by communication chip 104 when communicating with devices reachable via expansion card 110.

Due to expansion card 110 being an interposer for one or more devices, as discussed with regard to FIG. 1, default communication link training settings may require updating for communication between communication chip 104.

At operation 220, management controller 106 may generate updated training settings based on the interpretation of the identification information. By generating the updated training settings, the bifurcation settings necessary for communication with expansion card 110 may be implemented during communication link training.

At interaction 222, the updated training settings may be sent to startup management entity 200. Due to the updated training settings being based on the bifurcation settings, the updated training settings may be used to properly configure the communication between communication chip 104 and expansion card 110.

Therefore, at interaction 224, startup management entity 200 may facilitate configuration of communication chip 104 (e.g., send configuration instructions to communication chip 104).

At processes 226, communication link training may be performed to configure communication chip 104 based on the updated training settings, and subsequently performed communication link training process using the bifurcation settings. By doing so, communication chip 104 may be properly configured for communication between communication chip 104 and expansion card 110. Thus, the one or more devices whose operable connection is facilitated by expansion card 110 may be used to facilitate functionalities of the data processing system, thereby allowing provision of computer implemented services by the data processing system.

As discussed above, the components (depicted using data structures and data flows) of FIGS. 1-2B may perform (and/or be used to perform) various methods for managing a startup of a data processing system in a manner that enhances operation of the data processing system.

To further clarify embodiments disclosed herein, a flow diagram in accordance with an embodiment is shown in FIG. 3. This flow diagram shows a method that may enhance operation of a data processing system. While described with respect to a startup of the data processing systems, it will be understood that embodiments disclosed herein are broadly applicable to different use cases (e.g., different data management) as well as different types of data processing systems than those described below.

In the flow diagram discussed below, any of the operations may be repeated, performed in different orders, omitted, and/or performed in parallel manner with other operations or a partially overlapping in-time manner with other operations.

Turning to FIG. 3, a flow diagram illustrating a method for managing a startup of a data processing system in a manner that enhances operation of the data processing system in accordance with an embodiment is shown. The method may be performed by, for example, a data processing system and/or other components illustrated and/or discussed in FIGS. 1-2B.

At operation 300, a startup of a data processing system is identified. The identification may be performed by obtaining data indicating that a performance of the startup has been initiated. For example, the data processing system may be powered on (e.g., by pressing a power button), thereby initiating the startup. Once powered, and as discussed with respect to FIG. 2A, a BIOS of the data processing system may cause a notification to be sent to a management controller of the data processing system. This notification may include data indicative of startup initiation. Additionally, the identification may be performed by an acknowledgment of power obtained (e.g., from powering on the data processing system).

At operation 302, a first determination is made regarding whether a device is present in an expansion slot of the data processing system. The first determination may be made by attempting to obtain electrical signals from the expansion slot. For example, if the electrical signals are not obtainable, then it may be determined that the device is not present in the expansion slot and/or is not properly connected to electrical contacts of the expansion slot. If the electrical signals are obtainable, then it may be determined that the device is present and operably connected. Additionally, the obtaining of the electrical signals may be performed as the BIOS facilitates inventory of hardware components of the data processing system and part of the startup process If determined that the device is present, then the method may proceed to operation 304. Otherwise, the method may end following operation 302.

At operation 304, an attempt is made to obtain identification information from the device. The attempt may be made by requesting the identification information from a controller of the device.

At operation 306, a second determination is made regarding whether the identification information is obtained. The second determination may be made by (i) obtaining the identification information from the controller, or (ii) not obtaining the identification information from the controller.

If determined that the identification information is not obtained, then the method may proceed to operation 308. Otherwise, the method may proceed to operation 310 following operation 306.

At operation 308, communication link training for communication with the device is initiated using default communication link training settings. The communication link training may be initiated by configuring communication links for the device using default information accessible to the data processing system (e.g., the inventory of the hardware components). For example, based on the inventory, the type of the device may be known. Based on the type of the device, configuration of the communication links may be facilitated based on known electrical signaling schemes and communication rates for the device.

The method may end following operation 308.

Returning to operation 306, the method may proceed to operation 310 following operation 306 if it is determined that the identification information is obtained from the device.

At operation 310, the identification information is interpreted to obtain communication link bifurcation settings for the device. The identification information may be interpreted by using a lookup to identify the type of the device based on the identification information. For example, the identification information may specify that the device is a serial advanced technology attachment (SATA) expansion card (e.g., the type of the device may be an expansion card that allows for a variation in a quantity of storage devices capable of being operably connected to the expansion card). Based on the device being an expansion card, a lookup may be performed to obtain the communication link bifurcation settings (e.g., how conductors should be used for configuration of sub-communication links for communication with the device, required electrical signaling schemes for the communication, and/or communication rates for each sub-communication links) necessary for proper configure for communication with the device. The lookup may use, for example, a database stored locally on the data processing system. Additionally, the identification information may include the communication link bifurcation settings (e.g., the identification may include how the conductors should be used for configuration of the sub-communication links for communication with the device, the required electrical signaling schemes for the communication, etc.). Therefore, a process such as a lookup may not be performed to obtain the communication link bifurcation settings for the device.

At operation 312, default communication link training settings are updated based on the communication link bifurcation settings to obtain updated training settings. The update may be performed by (i) reading the communication link bifurcation settings, and (iii) modifying default communication training settings to accommodate the communication link bifurcation settings, thereby obtaining the updated training settings. For example, in the default communication training settings, the conductors that facilitate a communication link with the device may be used in a particular manner (e.g., all the conductors may be used for a single device). Once modified, the updated training settings may include instructions for using the conductors in a manner that facilitates sub-communication links, each sub-communication link being an avenue for communication with one of a group of devices connected to the data processing system through the device.

At operation 314, expansion slot training is initiated for the device using the updated training settings. Expansion slot training may be initiated by configuration of communication devices and/or communication links based on the updated training settings. Thus, the communication may be established between the device and the communication devices.

The method may end following operation 314.

Any of the components illustrated and/or discussed in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an acceler-ometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic

428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a startup of a data processing system, the method comprising:

identifying a startup of the data processing system;

making a first determination, based on the identification, regarding whether a device is present in an expansion slot of the data processing system;

in an instance of the first determination in which the device is present in the expansion slot:

attempting to obtain identification information from the device by:

requesting, via a request and by a management controller of the data processing system, the identification information from a controller of the device;

making a second determination regarding whether the identification information is obtained; and in a first instance of the second determination in which the identification information is not obtained:

initiating communication link training for a communication link between the device and a communication device of the data processing system using default communication link training settings, the default communication link training settings being pre-stored within the data processing system and are used to configure how conductors of the communication link should be used for the data processing system to communicate with additional devices connected to the data processing system through the device; and in a second instance of the second determination in which the identification information is obtained:

interpreting the identification information to obtain communication link bifurcation settings for the device, the communication link bifurcation settings also being pre-stored locally on the data processing system;

updating the default communication link training settings based on the communication link bifurcation settings to obtain updated training settings; and initiating the communication link training for the communication link using the updated training settings.

2. The method of claim 1, wherein the device is an expansion card that passes through communications via the communication link to at least a second device attached to the expansion card.

3. The method of claim 2, wherein the management controller sends the request for the identification information to the device via a sideband channel, and the expansion slot is operably connected to a processing complex of the data processing system via a communication channel.

4. The method of claim 3, wherein interpreting the identification information comprises:

performing a lookup based on a type of the device, the lookup returning the communication link bifurcation settings.

5. The method of claim 4, wherein the communication link bifurcation settings specify a division of sub-links of the communication link, the division defining a portion of the sub-links for exclusive use by the second device, and the portion comprising less than all of the sub-links.

6. The method of claim 4, wherein updating the default communication training link settings comprises:

providing, by the management controller, the updated training settings to a startup management entity of the data processing system tasked with performing the startup; and configuring, by the startup management entity and based on the updated training settings, the communication device that supports the communication link.

7. A non-transitory machine-readable medium having instructions stored therein, which when executed by a processor, cause the processor to perform operations for managing a startup of a data processing system, the operations comprising:

identifying a startup of the data processing system;

making a first determination, based on the identification, regarding whether a device is present in an expansion slot of the data processing system;

in an instance of the first determination in which the device is present in the expansion slot:

attempting to obtain identification information from the device by:

requesting, via a request and by a management controller of the data processing system, the identification information from a controller of the device;

making a second determination regarding whether the identification information is obtained; and in a first instance of the second determination in which the identification information is not obtained:

initiating communication link training for a communication link between the device and a communication device of the data processing system using default communication link training settings, the default communication link training settings being pre-stored locally on the data processing system and are used to configure how conductors of the communication link should be used for the data processing system to communicate with additional devices connected to the data processing system through the device; and in a second instance of the second determination in which the identification information is obtained:

interpreting the identification information to obtain communication link bifurcation settings for the device, the communication link bifurcation settings also being pre-stored locally on the data processing system;

updating the default communication link training settings based on the communication link bifurcation settings to obtain updated training settings; and initiating the communication link training for the communication link using the updated training settings.

8. The non-transitory machine-readable medium of claim 7, wherein the device is an expansion card that passes through communications via the communication link to at least a second device attached to the expansion card.

9. The non-transitory machine-readable medium of claim 8, wherein the management controller sends the request for the identification information to the device via a sideband channel, and the expansion slot is operably connected to a processing complex of the data processing system via a communication channel.

10. The non-transitory machine-readable medium of claim 9, wherein interpreting the identification information comprises:

performing a lookup based on a type of the device, the lookup returning the communication link bifurcation settings.

11. The non-transitory machine-readable medium of claim 10, wherein the communication link bifurcation settings specify a division of sub-links of the communication link, the division defining a portion of the sub-links for exclusive use by the second device, and the portion comprising less than all of the sub-links.

12. The non-transitory machine-readable medium of claim 11, wherein updating the default communication link training settings comprises:

providing, by the management controller, the updated training settings to a startup management entity of the data processing system tasked with performing the startup; and configuring, by the startup management entity and based on the updated training settings, the communication device that supports the communication link.

13. A data processing system, comprising:

a processor; and a memory coupled to the processor to store instructions, which when executed by the processor, cause the processor to perform operations for managing a startup of a data processing system, the operations comprising:

identifying a startup of the data processing system;

making a first determination, based on the identification, regarding whether a device is present in an expansion slot of the data processing system;

in an instance of the first determination in which the device is present in the expansion slot:

attempting to obtain identification information from the device by:

requesting, via a request and by a management controller of the data processing system, the identification information from a controller of the device;

making a second determination regarding whether the identification information is obtained; and in a first instance of the second determination in which the identification information is not obtained:

initiating communication link training for a communication link between the device and a communication device of the data processing system using default communication link training settings, the default communication link training settings being pre-stored within the data processing system and are used to configure how conductors of the communication link should be used for the data processing system to communicate with additional devices connected to the data processing system through the device; and in a second instance of the second determination in which the identification information is obtained:

interpreting the identification information to obtain communication link bifurcation settings for the device, the communication link bifurcation settings also being pre-stored locally on the data processing system;

updating the default communication link training settings based on the communication link bifurcation settings to obtain updated training settings; and initiating the communication link training for the communication link using the updated training settings.

14. The data processing system of claim 13, wherein the device is an expansion card that passes through communications via the communication link to at least a second device attached to the expansion card.

15. The data processing system of claim 14, wherein the management controller sends the request for the identification information to the device via a sideband channel, and the expansion slot is operably connected to a processing complex of the data processing system via a communication channel.

16. The method of claim 1, wherein the default communication link training settings are obtained using an inventory of hardware components maintained by the data processing system.

17. The method of claim 16, wherein the inventory of hardware components maintained by the data processing system is used to identify a type of the device.

18. The data processing system of claim 15, wherein interpreting the identification information comprises:

performing a lookup based on a type of the device, the lookup returning the communication link bifurcation settings.

19. The data processing system of claim 18, wherein the communication link bifurcation settings specify a division of sub-links of the communication link, the division defining a portion of the sub-links for exclusive use by the second device, and the portion comprising less than all of the sub-links.

20. The data processing system of claim 19, wherein updating the default communication link training settings comprises:

providing, by the management controller, the updated training settings to a startup management entity of the data processing system tasked with performing the startup; and configuring, by the startup management entity and based on the updated training settings, the communication device that supports the communication link.

* * * * *